United States Patent
Tian et al.

(10) Patent No.: US 10,285,100 B2
(45) Date of Patent: May 7, 2019

(54) INDICATION OF IMEISV OVER MAP FOR INTER-MSC HANDOVER

(71) Applicant: Alcatel Lucent, Boulogne-Billancourt (FR)

(72) Inventors: Lu Tian, Plano, TX (US); Bruno Landais, Lannion (FR); John Matthew Gafrick, Naperville, IL (US)

(73) Assignee: ALCATEL LUCENT, Boulogne-Billancourt (FR)

( * ) Notice: Subject to any disclaimer, the term of this patent is extended or adjusted under 35 U.S.C. 154(b) by 43 days.

(21) Appl. No.: 15/305,562

(22) PCT Filed: Apr. 21, 2015

(86) PCT No.: PCT/EP2015/058540
§ 371 (c)(1),
(2) Date: Oct. 20, 2016

(87) PCT Pub. No.: WO2015/162103
PCT Pub. Date: Oct. 29, 2015

(65) Prior Publication Data
US 2017/0041843 A1   Feb. 9, 2017

(30) Foreign Application Priority Data
Apr. 23, 2014  (EP) .................... 14165694

(51) Int. Cl.
*H04W 8/22*  (2009.01)
*H04W 8/24*  (2009.01)
(Continued)

(52) U.S. Cl.
CPC ............. *H04W 36/12* (2013.01); *H04W 8/22* (2013.01); *H04W 8/24* (2013.01); *H04W 36/0083* (2013.01)

(58) Field of Classification Search
CPC ... H04W 36/0083; H04W 36/12; H04W 8/22; H04W 8/24
See application file for complete search history.

(56) References Cited

U.S. PATENT DOCUMENTS 7,200,384 B1 * 4/2007 Tervo .................... H04W 8/245
455/412.1
2004/0052224 A1 * 3/2004 Arvidsson ............... H04W 8/12
370/329
(Continued)

OTHER PUBLICATIONS

3GPP TS 23.195 V5.4.0 (Sep. 2004); 3rd Generation Partnership Project; Technical Specification Group Services and System Aspects; Provision of User Equipment Specific Behaviour Information (UESBI) to network entities (Release 5).*

(Continued)

*Primary Examiner* — Kashif Siddiqui
(74) *Attorney, Agent, or Firm* — Harness, Dickey & Pierce, PLC

(57) ABSTRACT

An example method for inter-Mobile Switching Center (MSC) handover of a mobile device includes requesting, by an anchor MSC subsequent to sending a Mobile Application Part (MAP) Prepare Handover message, the International Mobile Equipment Identity and Software Version Number (IMEISV) from the mobile device. The anchor MSC receives the IMEISV of the mobile device in response to the requesting and forwards the IMEISV and/or a corresponding UESBI-Iu in a message to a target MSC. The MAP Prepare Handover message may have been forwarded without the IMEISV of the mobile device when such IMEISV was not yet available at the time the inter-MSC handover was initiated. The IMEISV and/or corresponding User Equipment Specific Behavior Information (UESBI)-Iu may be (Continued)

forwarded in new Information Elements (IEs) in a MAP Forward Access Signaling (FAS) message to the target MSC.

15 Claims, 10 Drawing Sheets

(51) Int. Cl.
*H04W 36/00* (2009.01)
*H04W 36/12* (2009.01)

(56) References Cited

U.S. PATENT DOCUMENTS

| | | | |
|---|---|---|---|
| 2004/0116120 A1* | 6/2004 | Gallagher | H04W 60/04 455/436 |
| 2004/0147242 A1* | 7/2004 | Pasanen | H04W 8/22 455/403 |
| 2006/0019647 A1* | 1/2006 | Muhonen | H04W 36/14 455/419 |
| 2009/0270099 A1* | 10/2009 | Gallagher | H04W 8/08 455/435.1 |
| 2010/0255846 A1* | 10/2010 | Vikberg | H04J 11/0069 455/436 |
| 2013/0295933 A1* | 11/2013 | Molnar | H04W 36/0055 455/436 |

OTHER PUBLICATIONS

3GPP TS 24.008 V6.5.0 (Jun. 2004); 3rd Generation Partnership Project; Technical Specification Group Core Network; Mobile radio interface Layer 3 specification; Core network protocols; Stage 3 (Release 6).*

Alcatel-Lucent: "Providing IMEISV to RAN for device handling", vol. RAN WG3, No. Chicago, USA; Apr. 15, 2013-Apr. 19, 2013, Apr. 5, 2013 (Apr. 5, 2013), XP050700500, Retrieved from the Internet <URL:http://www.3gpp.org/ftp/tsg_ran/WG3_lu/TSGR3_79bis/Docs/> [retrieved on Apr. 5, 2013].

Nokia: "A-Interface handling", 3GPP Draft; S2-031912, 3rd Generation Partnership Project (3GPP), Mobile Competence Centre ; 650, Route Des Lucioles ; F-06921 Sophia-Antipolis Cedex ; France, vol. SA WG2, No. San Diego, USA; May 7, 2003, May 7, 2003 (May 7, 2003), XP050244536.

Vodafone et al: "Provide IMEISV to eNB to identify UE characteristics", vol. RAN WG3, No. Prague, Feb. 9, 2014 (Feb. 9, 2014), XP050738528, Retrieved from the Internet <URL:http://www.3gpp.org/ftp/Meetings_3GPP_SYNC/RAN/RAN3/Docs/> [retrieved on Feb. 9, 2014].

Vodafone et al: "Providing IMEISV to eNB for Device Handling", vol. RAN WG3, No. Prague, Feb. 9, 2014 (Feb. 9, 2014), XP050738527, Retrieved from the Internet <URL:http://www.3gpp.org/ftp/Meetings_3GPP_SYNC/RAN/RAN3/Docs/> [retrieved on Feb. 9, 2014].

International Search Report PCT/ISA/210 for International Application No. PCT/EP2015/058540 dated Jul. 21, 2015.

Written Opinion of the International Searching Authority PCT/ISA/237 for International Application No. PCT/EP2015/058540 dated Jul. 21, 2015.

3rd Generation Partnership Project; Technical Specification Group Core Network and Terminals; Mobile radio interface Layer 3 specification; Core network protocols; Stage 3 (Release 12), 3GPP TS 24.008 V12.5.0 (Mar. 2014), Mar. 14, 2014.

* cited by examiner

MAP_FORWARD_ACCESS_SIGNALLING

| Parameter name | Request | Indication |
|---|---|---|
| Invoke Id | M | M(=) |
| Integrity Protection Information | C | C(=) |
| Encryption Information | C | C(=) |
| Key Status | C | C(=) |
| AN-APDU | M | M(=) |
| Allowed GSM Algorithms | C | C(=) |
| Allowed UMTS Algorithms | C | C(=) |
| Radio Resource Information | C | C(=) |
| Radio Resource List | C | C(=) |
| BSSMAP Service Handover | C | C(=) |
| BSSMAP Service Handover List | C | C(=) |
| RANAP Service Handover | C | C(=) |
| Iu-Currently Used Codec | C | C(=) |
| Iu-Supported Codecs List | C | C(=) |
| RAB Configuration Indicator | C | C(=) |
| Iu-Selected Codec | C | C(=) |
| Alternative Channel Type | C | C(=) |
| Trace Propagation List | C | C(=) |
| AoIP-Supported Codecs List Anchor | C | C(=) |
| AoIP-Supported Codec Target | C | C(=) |
| IMEISV | C | C(=) |
| UESBI-Iu | C | C(=) |

*FIG. 3*

INDICATION OF IMEISV OVER MAP FOR INTER-MSC HANDOVER

CROSS-REFERENCE TO RELATED APPLICATIONS

This application is the U.S. National Phase application of PCT Application No. PCT/EP2015/058540 filed on Apr. 21, 2015, which claims priority to European Patent Application No. 14165694.2 filed on Apr. 23, 2014, the entire contents of each of which are incorporated herein by reference.

BACKGROUND

Field

This invention relates generally to communication systems, and, more particularly, to wireless communication systems.

Description of the Related Art

A conventional communication system uses one or more access nodes to provide network connectivity to one or more mobile devices. The access nodes may be referred to as access points, access networks, base stations, base station routers, cells, femtocells, and the like. For example, in a cellular communication system that operates according to Universal Mobile Telecommunication Services (UMTS) standards, one or more access nodes may be used to provide wireless network connectivity to mobile devices. Mobile devices may include cellular telephones, personal data assistants, smart phones, laptop devices, text messaging devices, Global Positioning Systems, navigation systems, network interface cards, notebook computers, desktop computers, and the like and may also be call mobile subscribers or user equipment. Numerous types and generations of wireless communication systems have been developed and deployed to provide network connectivity for mobile devices. Exemplary wireless communication systems include systems that provide wireless connectivity to micro cells (e.g., systems that provide wireless connectivity according to the IEEE 802.11, IEEE 802.15, or Wi-Fi standards) and systems that provide wireless connectivity to macro cells (e.g., systems that operate according to the Third Generation Partnership Project standards—3GPP, 3GPP2—and/or systems operate according to the IEEE 802.16 and IEEE 802.20 standards). Multiple generations of these systems have been deployed including Second Generation (2G), Third Generation (3G), and Forth Generation (4G).

Wireless telecommunications networks provide mobile subscribers with the ability to access telecommunications services from almost anywhere in the world. Mobility management facilitates such world-wide access. With mobility management, wireless networks are able to track the locations of mobile devices so that mobile services can be delivered to the mobile devices.

A wireless network is typically formed of a number of cells, each coveting a small geographic area within which a mobile device may receive mobile services. A cell is typically equipped with a base station that provides radio coverage to the cell, thereby enabling communication with mobile devices located within the cell. By integrating the coverage of multiple base stations, a wireless network is able to provide radio coverage to mobile stations over large geographic areas.

The coverage area of a collection of neighboring base stations is commonly referred to as a location area. A location area is served by a Mobile Switching Center (MSC), and a MSC may serve multiple location areas. The MSC is the network node that provides circuit-switched calling, mobility management, and various other services (e.g., telecommunications services, mobile services, and the like) to mobile subscribers. The MSC maintains subscriber data for the mobile devices that are currently located within the location areas served by the MSC. Mobile subscriber data is permanently maintained in a Home Location Register (HLR) within the wireless network. When a mobile device is within the range of an MSC, the MSC acquires the mobile subscriber data from the HLR and maintains it in a Visiting Location Register (VLR) associated with the MSC. The location area of the mobile station is also maintained in the VLR associated with the MSC, for use by the MSC to page the mobile device in the location area when a Mobile Termination (MT) call is intended for the mobile device. The MSC that is associated with the current location area of a mobile station may be referred to as a Visiting Mobile Switching Center (VMSC) relative to the mobile station. The MSC receiving an MT call that is intended for the mobile subscriber may be referred to as a Gateway MSC (GMSC) for the mobile device. A combination of the MSC and the VLR for the MSC also may be referred to as an MSC/VLR.

When the mobile device on a cell has a Radio Resource (RR) connection, it also measures the signals of all neighboring cells and sends the measurement report to Base Station Controller/Radio Network Controller (BSC/RNC). Based on the signal strengths of the neighboring cells, BSC/RNC initiates a handover by sending HO/Relocation Required to the MSC. The mobile device does not move to the new cell until HO/Relocation Command is received.

When the mobile device on a cell is in the idle state, it measures the signals of all neighboring cells. The mobile device moves to the new cell (the neighboring cell with the strongest signal). Then the mobile device determines the location area identifier (LAI) changes by comparing the LAI of the new cell and the LAI stored in the mobile device. If the LAI changes, the mobile device sends Location Update message to the MSC.

During a call, Base Station Subsystem/Radio Network Controller (BSS/RNC) determines that a mobile device moves or "roams" from an old location area into a new location area and sends a handover required/relocation required message to the wireless core network (which requests that a handover procedure be performed). When the new VMSC serving the new location of the mobile device is different than the old VMSC serving the old location of the mobile device, an inter-MSC handover is performed as part of the handover procedure. In the context of the inter-MSC handover, "old" MSC means the "anchor" MSC; the "new" MSC means "target"/"serving" MSC.

When a call is not active and a mobile device roams, location updates are utilized to track the location and serving VMSC. For example, in a typical MT call scenario, an incoming call to the mobile station is first routed to a gateway mobile switching center (GMSC) of the called mobile station's HPLMN (Home Public Line Mobile Network). Upon receiving the call, the GMSC queries the HLR of the mobile subscriber to determine the VMSC on which the mobile station is currently registered. The HLR typically obtains routing information from the VMSC and returns it to the GMSC. The GMSC uses the routing information to route the call to the VMSC. The VMSC accesses its subscriber data for the called mobile subscriber to determine its location area and pages the mobile station within that location area to set-up a call connection between the caller and the mobile subscriber.

A mobile device can be identified by an International Mobile Station Equipment Identity (IMEI), a unique number assigned to the mobile device. A wireless network can utilize the IMEI to identify valid devices and provide other services. For instance, an MEI can be used to prevent a reported-stolen phone from accessing the network. The IMEI is only used for identifying the device and has no permanent or semi-permanent relation to the user of the device, who is identified by transmission of an International Mobile Subscriber Identify (IMSI) number.

Many network and security features are enabled by knowing the current mobile device being used by a subscriber. The mobile device may be identified by the IMEI or the IMEI Software Version (IMEISV), which include information on the origin, model, and serial number of the device. Examples of services that use IMEISV are Trace and User Equipment Specific Behaviour information (UESBI). In UESBI, the Core Network provides the Radio Access Network (RAN) with the IMEISV of the mobile device to enable the RAN to adapt its behaviour and the features it uses based on the characteristics (e.g., when the behaviour of a mobile device and the implementation of a feature in the RAN is known to not be fully compatible).

SUMMARY

For the 2G access, the anchor Mobile Switching Center (MSC) requests the International Mobile Equipment Identity and Software Version Number (IMEISV) during the Global System for Mobile Communications (GSM) cipher mode procedure.

However, the IMEISV may not be available on the target MSC if the inter-MSC handover takes place prior to GSM ciphering complete. This impacts the services on the target MSC that use IMEISV. Likewise, the same problem occurs for the 3G access if the anchor MSC gets the IMEISV after triggering the inter-MSC complete message.

Furthermore, the current 3GPP specifications (see TS 29.002) restrict the use of the IMEISV in the Mobile Application Part (MAP) Prepare Handover message for the Trace feature only. This means that even in scenarios where the anchor MSC would know the IMEISV prior to triggering the inter-MSC handover (e.g., the IMEISV is available on the target MSC if the inter-MSC handover takes place after GSM ciphering complete), this IMEISV cannot be used by the target MSC for other services making use of that parameter. If available, the anchor/old MSC passes IMEISV in MAP Prepare Handover message to the target/new MSC, for use by the Trace service only. This prevents using this parameter for other services such as UESBI.

The disclosed subject matter is directed to addressing the effects of one or more of the problems set forth. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Embodiments provided herein disclose a method and apparatus for forwarding an indication of IMEISV over a message for inter MSC handover.

In one embodiment, a method for inter-Mobile Switching Center (MSC) handover of a mobile device, includes requesting, by an anchor MSC subsequent to sending a Mobile Application Part (MAP) Prepare Handover message, an International Mobile Equipment Identity and Software Version Number (IMEISV) of the mobile device from the mobile device, and receiving, at the anchor MSC, the IMEISV of the mobile device in response to the requesting. The IMEISV and/or a corresponding User Equipment Specific Behaviour Information over the IU interface (UESBI-Iu) value is forwarded from the anchor MSC in a message to a target MSC.

In one embodiment, the method also includes sending from an anchor MSC, a MAP Prepare Handover message. In one embodiment, the method includes sending from the anchor MSC, the MAP Prepare Handover message without the IMEISV of the mobile device.

In one embodiment, the requesting includes requesting at the anchor MSC the IMEISV from the mobile device by initiating a Global System for Mobile Communication (GSM) ciphering mode procedure if the mobile device has been handed over to a GSM/EDGE Radio Access Network (GERAN) or by initiating the Non-Access Stratum (NAS) Identity Request procedure if the mobile device has been handed over to a Universal Terrestrial Radio Access Network (UTRAN).

In one embodiment, the forwarding includes passing the IMEISV in a new IMEISV Information Element (IE) and/or the corresponding UESBI-Iu in a new UESBI-Iu IE in a MAP Forward Access Signaling (FAS) message to the target MSC In one embodiment, the passing includes passing the IMEISV in a new IMEISV information Element (IE) and/or the corresponding UESBI-Iu value in a new UESBI-Iu IE in a MAP Forward Access Signaling (FAS) message to the target MSC with an Access Network Application Protocol Data Unit (AN-APDU).

In one embodiment, the method also includes storing at the target MSC the IMEISV from the mobile device for use during procedures making use of the IMEISV or UESBI-Iu.

In one embodiment, a method for inter-Mobile Switching Center (MSC) handover of a mobile device to GERAN, includes receiving at a target MSC, a MAP Prepare Handover message without an International Mobile Equipment Identity and Software Version Number (IMEISV) of the mobile device; receiving subsequently at the target MSC the IMEISV of the mobile device; and storing at the target serving MSC the IMEISV from the mobile device for use during procedures making use of the IMEISV.

In one embodiment, receiving subsequently the IMEISV includes receiving the IMEISV in Global System for Mobile Communication (GSM) ciphering mode procedure complete message.

In one embodiment, an apparatus for use in inter-Mobile Switching Center (MSC) handover of a mobile device is provided. The apparatus includes a processor and an associated memory, with the processor configured to request, subsequent to sending a MAP Prepare Handover message, the IMEISV from the mobile device; receive the IMEISV of the mobile device in response to the requesting; and forward the IMEISV and/or a corresponding UESBI-Iu in a message to a target MSC.

In one embodiment, the processor is configured to request the IMEISV from the mobile device by initiating a Global System for Mobile Communication (GSM) ciphering mode procedure if the mobile device has been handed over to GERAN.

In one embodiment, the processor is configured to request the IMEISV from the mobile device by initiating the Non- Access Stratum (NAS) Identity Request procedure if the mobile device has been handed over to UTRAN.

In one embodiment, the processor is configured to forward the IMEISV in a new IMEISV Information Element (IE) and/or the corresponding UESBI-Iu in a new UESBI-Iu IE in a MAP Forward Access Signaling (FAS) message to the target MSC.

In another embodiment, an apparatus including a processor and an associated memory for use in inter-Mobile Switching Center (MSC) handover of a mobile device is provided. The processor is configured to receive an International Mobile Equipment Identity and Software Version Number (IMEISV) in Global System for Mobile Communication (GSM) ciphering mode procedure complete message, and store the IMEISV for use during procedures making use of the IMEISV.

In one embodiment, the apparatus is configured to receive at a target MSC, a MAP Prepare Handover message without the IMEISV of the mobile device.

In one embodiment, the apparatus is a MSC.

BRIEF DESCRIPTION OF THE DRAWINGS

The disclosed subject matter may be understood by reference to the following description taken in conjunction with the accompanying drawings, in which like reference numerals identify like elements, and in which:

FIG. 3 is a diagram illustrating an exemplary MAP_Forward_Access_Signaling message for delivering IMEISV and UESBI-Iu to a new MSC;

Figure 1:
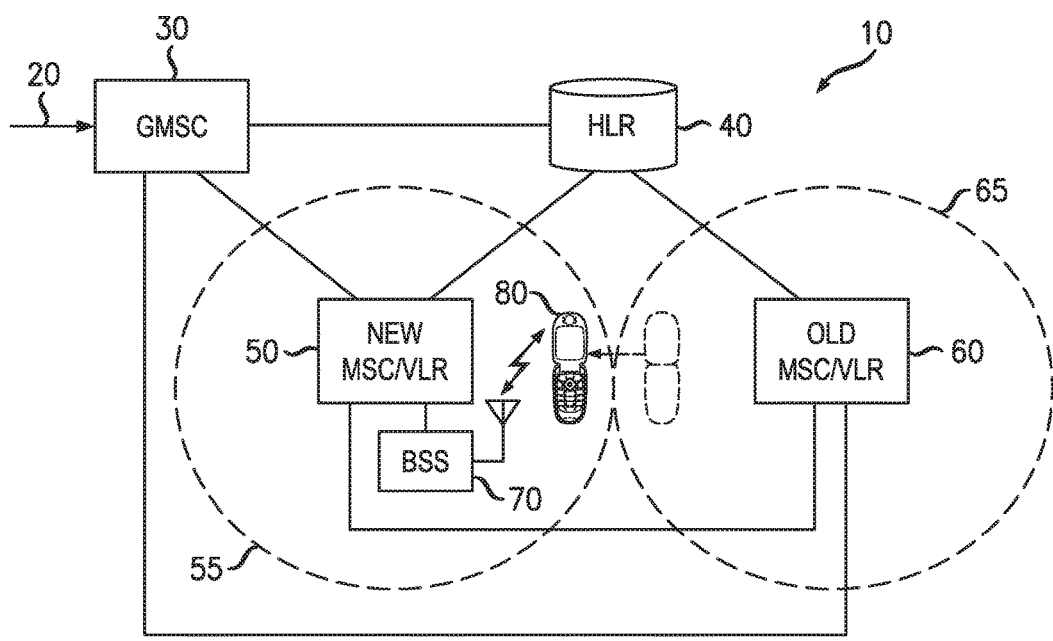
FIG. 1 is a block diagram illustrating an exemplary wireless network for delivering a mobile terminated call to a mobile device, in accordance with the embodiments of the invention.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Wireless networks around the world are in the process of updating from second and third generation (2G/3G) networks to Long Term Evolution (LTE, also known as 4G) networks. Until LIE networks and mobile stations fully support voice services directly over LTE, the mobile stations may be made capable of performing the Circuit-Switched FallBack (CSFB) procedure to be able to support voice services on 2G/3G. CSFB requires that the LTE mobile station perform the location update procedure with the circuit-switched core network so that LTE mobile station is reachable for MT circuit-switched calls. The LTE access network is configured to pass location update messages from LTE mobile stations to a 2G/3G VMSC. When a mobile terminated call is received by the GMSC for a mobile station currently camped on LTE, the mobile station normally receives a circuit-switched page request on the LTE radio via the VMSC and LTE access network, recognizes that it cannot complete the call on LIE and initiates the CSFB procedure by returning to a 2G/3G radio to respond to the page and allow the call to complete. There are several cases, however, when the 2G/3G radio to which the mobile station retunes is not in a location area of the VMSC. This can occur, for example, when the mapping of LTE tracking areas to CS location areas is imprecise, when the mobile station is on a border between location areas, or when the VMSC managing the 2G/3G radio to which the mobile station retunes has not been upgraded or configured to accept location update requests via the LTE access network, in this latter case, the LTE access network may be configured to send location update requests to a compatible VMSC that is not associated with the location area of the 2G/3G radio. In all of these cases, the mobile station first performs the location update procedure upon returning to the 2G/3G radio, after which MTRR (Mobile Termination Roaming Retry)/MTRF (Mobile Termination Roaming Forwarding)/SRVCC (Single Radio Voice Call Continuity) and potential alternative algorithms apply to enable successful call delivery. Rather than being an exception procedure during race conditions, as it is 2G/3G networks, this procedure will be common in some LTE networks.

FIG. 1 is a block diagram illustrating an exemplary wireless network 10 for delivering and handing over a MT call 20 to a mobile device 80, in accordance with embodiments of the present invention. The wireless network 10 includes a Gateway Mobile Switching Center (GMSC) 30, Mobile Switching Center/Visitor Location Registers (MSC/VLR 50 and 60), Base Station System (BSS) 70 for 2G (or Radio Network Controller (RNC) for 3G) and Home Location Register (HLR) 40. MSC/VLR 50 serves location area 55, while MSC/VLR 60 serves location area 65. It should be understood that each MSC/VLR 50 and 60 may serve multiple location areas. However, for simplicity, only one location for each MSC/VLR is shown.

As illustrated in FIG. 1, mobile device 80 has recently moved from location area 65 served by MSC/VLR 60 into location area 55 served by MSC/VLR 50 while a call is active, thus requiring a handover. Thus, MSC/VLR 60 is labeled "old MSC/VLR", while MSC/VLR 50 is labeled "new MSC/VLR." Once the mobile device 80 realizes that is has roamed into the new location area 55 served by the new MSC/VLR 50 (i.e., by determining that the location area id (LAI) received from BSS 70 is new), the mobile device 80 sends a handover request to the old MSC/VLR 60 via BSS serving area 65. Upon determining that a handover is required, the old Base Station Controller (BSC) of the Base Station System (BSS) issues a handover required message to the old MSC/VLR 60 directing an inter-MSC handover. Old MSC/VLR 60 issues a MAP Prepare Handover message to the target/new MSC/VLR 50.

Target/new MSC/VLR 50 issues a relocation request to the new Radio Network Controller (RNC) which returns a relocation request acknowledgement message from the target/new MSC/VLR 50. Thereafter, a prepare handover acknowledgement message is returned by the target/new MSC/VLR 50 to old MSC/VLR 60 which issues a handover command to the old BSS. New RNC also issues a relocation complete message to the new MSC, which in turn issues a process access signaling message to the old MSC, which in turn issues a clear command message to the old BSC directing clearing of information related to the handed over mobile device. The old BSC thereafter responds with a clear complete message.

Figure 2:
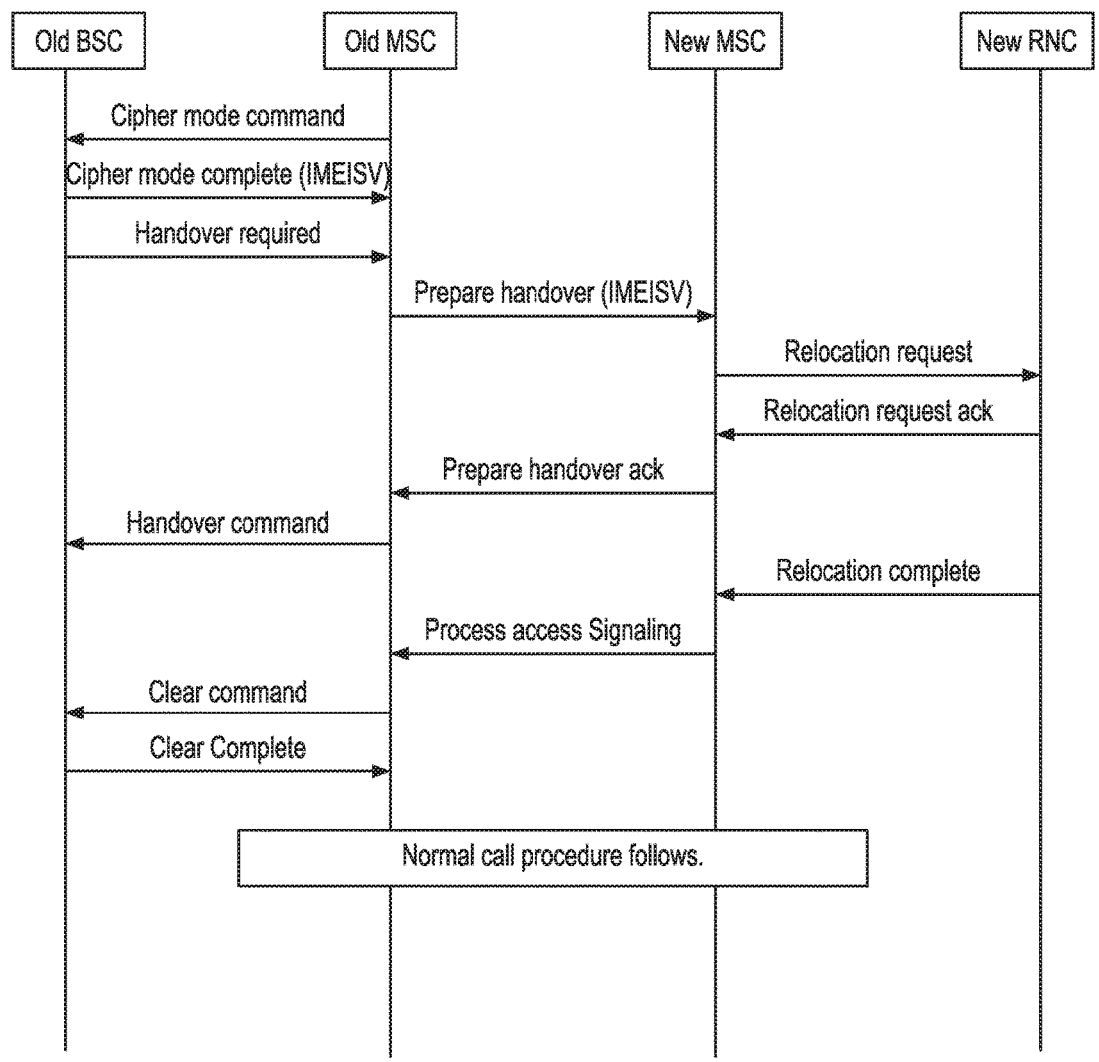
FIG. 2 is a signaling diagram illustrating exemplary signaling for delivering IMEISV to a new MSC for inter-MSC handover.

As described above, many network and security features are enabled by knowing the current mobile device that is being used by a subscriber, the mobile device being identified by IMEI or IMEISV. FIG. 2 is a signaling diagram illustrating exemplary signaling for delivering IMEISV to a new MSC for inter-MSC handover. IMEISV is available on the target MSC because the GSM cipher mode completed message has been received. Old MSC has issue a cipher mode command to old BSC, which has responded with a cipher mode complete message including the IMEISV. Thus, the timing of the messaging is such that when old BSC issues a handover required message directing an inter-MSC handover takes place after GSM ciphering complete, the anchor/old MSC is able to pass IMEISV in MAP Prepare Handover message to the target/new MSC.

However, the MAP specification unnecessarily restricts the use of the IMEISV in the MAP Prepare Handover message for the Trace feature only. This prevents using this parameter for other services such as UESBI. Additional messages are exchanged to complete the handover after which normal call procedures may follow. As discussed above with respect to FIG. 1, those additional messages include a relocation request message from the new MSC to the new Radio Network Controller (RNC), a relocation request acknowledgement message from the new RNC to the new MSC, a prepare handover acknowledgement message from the new MSC to the old MSC and a handover command message from the old MSC to the old BSC. Further additional messages include a relocation complete message from the new RNC to the new MSC, a process access signaling message from the new MSC to the old MSC and a clear command message from the old MSC to the old BSC which is responded to by a clear complete message. These messages are conventional messages known to one skilled in the art of the invention.

Nevertheless, due to timing considerations, the anchor MSC may not necessarily have the IMEISV of the mobile device at the time it sends the MAP Prepare Handover message to the target MSC. Note that in 2G, the MSC retrieves the IMEISV during the Cipher mode command procedure and in 3G, MSC retrieves the IMEISV during the Identity Request procedure. The time window between the establishment of the dedicated signalling connection and these procedures can last several seconds (e.g., if the MSC needs to query the HLR for authentication vectors and then for downloading the subscription information.) Thus, an inter-MSC handover may take place prior to the completion of the Cipher mode command procedure or Identity Request procedure, in which case the anchor MSC will get the IMEISV after having sent the MAP Prepare Handover message. Since Direct Transfer Application Part (DTAP) messages are exchanged between the anchor MSC and the mobile device transparently for the target/serving MSC, the target MSC cannot get the IMEISV by its own or read the IMEISV on the fly (e.g., when the anchor MSC triggers an Identity Request procedure after the inter-MSC handover).

Accordingly, it is proposed to according to embodiments described herein to allow the target MSC to use the IMEISV of a mobile device for the provision of services other than just the Trace feature, and to forward the IMEISV and/or UESBI-Iu to the target MSC after the GSM ciphering mode is complete. In one embodiment, it is proposed to introduce a new IMEISV Information Element (IE) and/or a new UESBI-Iu IF in the MAP Forward Access Signalling message for the purpose of providing the IMEISV and/or UESBI-Iu to the target MSC. The anchor MSC usually sends a MAP Forward Access Signalling message to the target MSC shortly after the inter-MSC handover to send Non_Access Startum (NAS) signalling to the UE (e.g., Temporary Mobile Subscriber Identify (TMSI) reallocation Request, Setup, Call Proceeding, and the like). Thus, the Trace feature and other services that make use of the IMEISV will be able to be used even if the anchor MSC gets the IMEISV after sending the MAP Prepare Handover Request message.

FIG. 3 is a diagram illustrating an exemplary MAP_FORWARD_ACCESS_SIGNALLING message for delivering IMEISV and UESBI-Iu to a new MSC. The MAP_FORWARD_ACCESS_SIGNALLING service is used between MSC-A and MSC-B (E-interface) to pass information to be forwarded to the A-interface or Iu-interface of MSC. The MAP_FORWARD_ACCESS_SIGNALLING message as defined by Table 8.4/4 section 8.4.4.2 in 3GPP TS 29.002 is augmented according to one embodiment to include the one or more of the IMEISV and UESBI-Iu. As illustrated in FIG. 3, IMEISV and UESBI-Iu IEs have been added to the conventional message.

After delivery of the of the MAP_FORWARD_ACCESS_SIGNALLING message described herein, the target MSC can use IMEISV for any services after an Inter-MSC handover, including scenarios where the IMEISV of the mobile device is not available at the time the anchor MSC triggers the Inter-MSC handover and consequently not included in the Prepare Handover message. Thus, according to embodiments provided herein, in all instances, when a call is handed over to the UMTS RNC, the target MSC passes IMEISV to the RNC. The RNC is then able to activate new features that utilize the IMEISV and/or UESBI for all mobile devices except the ones known to not properly support the new features.

The International Mobile Equipment Identity and Software Version Number (IMEISV) is requested from the mobile device during the GSM ciphering mode procedure.

For the inter-MSC 2G-3G handover, after GSM ciphering mode is complete, the anchor MSC requests IMEISV from the mobile device. Then, the anchor MSC passes IMEISV in a new IMEISV IE and/or a new UESBI-Iu IE in a message to the target MCS, for example in a MAP Forward Access Signaling (FAS) message with Access network application protocol data unit (AN-APDU) (for example, TMSI Reallocation Request, Call Processing, Setup for voice calls) to the target MSC.

For the inter-MSC 2G-2G handover, the anchor MSC receives IMEISV in GSM ciphering mode complete message. Then, the target MSC stores the IMEISV when the IMEISV is received in Cipher mode complete message, or upon receipt of the MAP Forward Access Signaling message as for the inter-MSC 2G-3G handover scenario.

Likewise, for an inter-MSC handover from 3G access, the anchor MSC passes on the IMEISV and/or UESBI IE to the target MSC in the MAP Forward Access Signaling message if the IMEISV was not available at the anchor MSC when triggering the inter-MSC handover.

According to the embodiments provided herein, the target MSC will have the LTE's IMEISV available for all services making use of that parameter, such as trace and UESBI. The target MSC can use IMEISV for any features, for example, traces and UESBI. In the case that the UESBI is passed to the target MSC, the target MSC or the target RNC can map IMEISV to UESBI.

Figure 4:
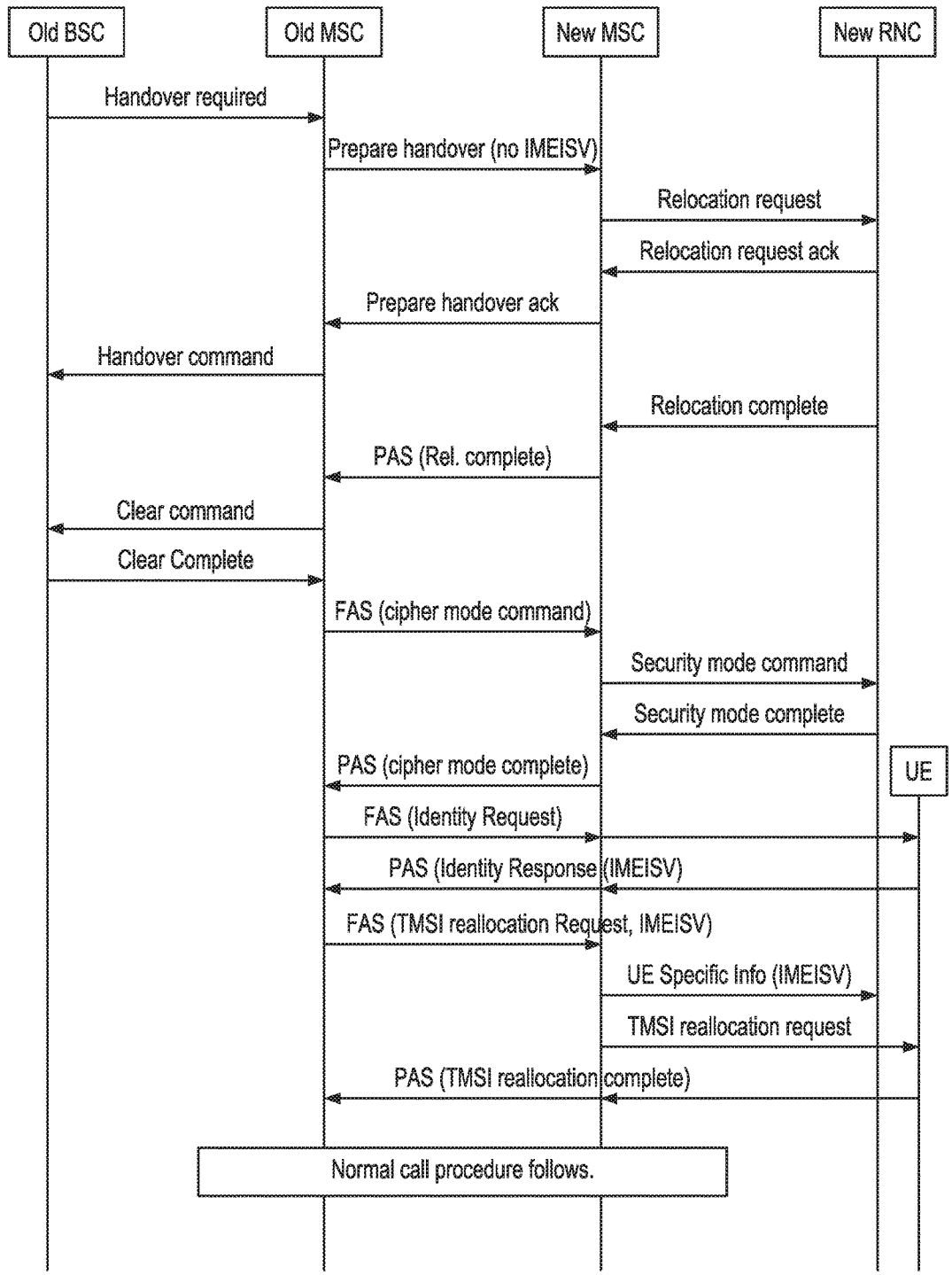
FIG. 4 is a signaling diagram illustrating exemplary signaling for delivering IMEISV and/or UESBI-Iu with Temporary Mobile Subscriber Identify (TMSI) Reallocation Command to a new MSC for inter-MSC 2G-3G handover.

FIG. 4 is a signaling diagram illustrating exemplary signaling for delivering IMEISV and/or UESBI-Iu with TMSI Reallocation Command to a new MSC for inter-MSC 2G-3G handover. Upon determining that a handover is required, the old BSC issues a handover required message to the old MSC/VLR directing an inter-MSC handover. Old MSC/VLR issues a MAP Prepare Handover message to the target/new MSC/VLR. However, as illustrated, the MAP Prepare Handover message does not include IMEISV.

As previously described, target/new MSC/VLR issues a relocation request to the new RNC which returns a relocation request acknowledgement message to the target/new MSC/VLR. Thereafter, a prepare handover acknowledgement message is returned by the target/new MSC/VLR to old MSC/VLR which issues a handover command to the old BSC. New RNC also issues a relocation complete message to the new MSC, which in turn issues a process access signaling (PAS) message to the old MSC, which in turn issues a clear command message to the old BSC directing clearing of information related to the handed over mobile device. The old BSC thereafter responds with a clear complete message.

The old MSC/VLR issues a FAS cipher mode command to the new MSC, which in turn issues a FAS security mode command to the new RNC. RNC then issues a security complete message to the new MSC, which in turn issues a PAS message indicating cipher mode complete to the old MSC.

The anchor MSC requests IMEISV from the UE in a FAS identity request and passes IMEISV and/or UESBI-Iu with TMSI Reallocation Command to the target MSC after receiving the IMEISV in a PAS identity response from the mobile device. The target MSC passes IMEISV/UESBI-Iu to the target RNC. The target MSC also passes a TMSI reallocation request to the mobile device. This applies for MO and MT if TMSI reallocation is required. Normal call procedures follow after the mobile device responds to the new MSC with PAS indicating TMSI reallocation is complete.

Figure 5:
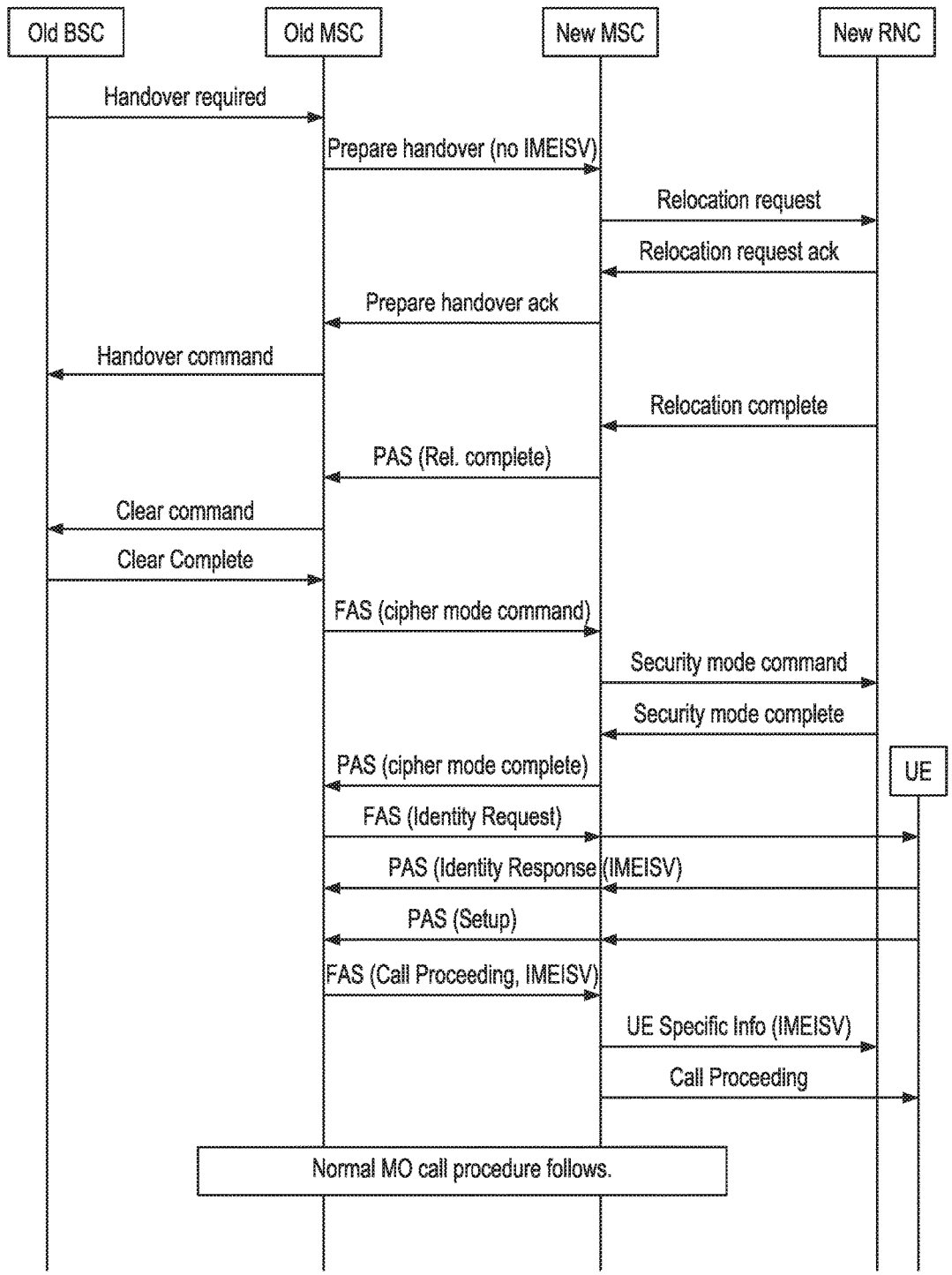
FIG. 5 is a signaling diagram illustrating exemplary signaling for Inter-MSC 2G-3G Handover for MO if TMSI reallocation is not required.

FIG. 5 is a signaling diagram illustrating exemplary signaling for Inter-MSC 2G-3G Handover for MO if TMSI reallocation is not required. Messaging similar to that described in FIG. 4 will not be repeated. In FIG. 5, the anchor MSC requests IMEISV from the UE in an identity request, and passes IMEISV and/or UESBI-Iu with Call Proceeding to the target MSC. The target MSC passes IMEISV/UESBI-Iu to the target RNC. The target MSC passes the Call Proceeding to the mobile device and normal MO call procedure follows.

Figure 6:
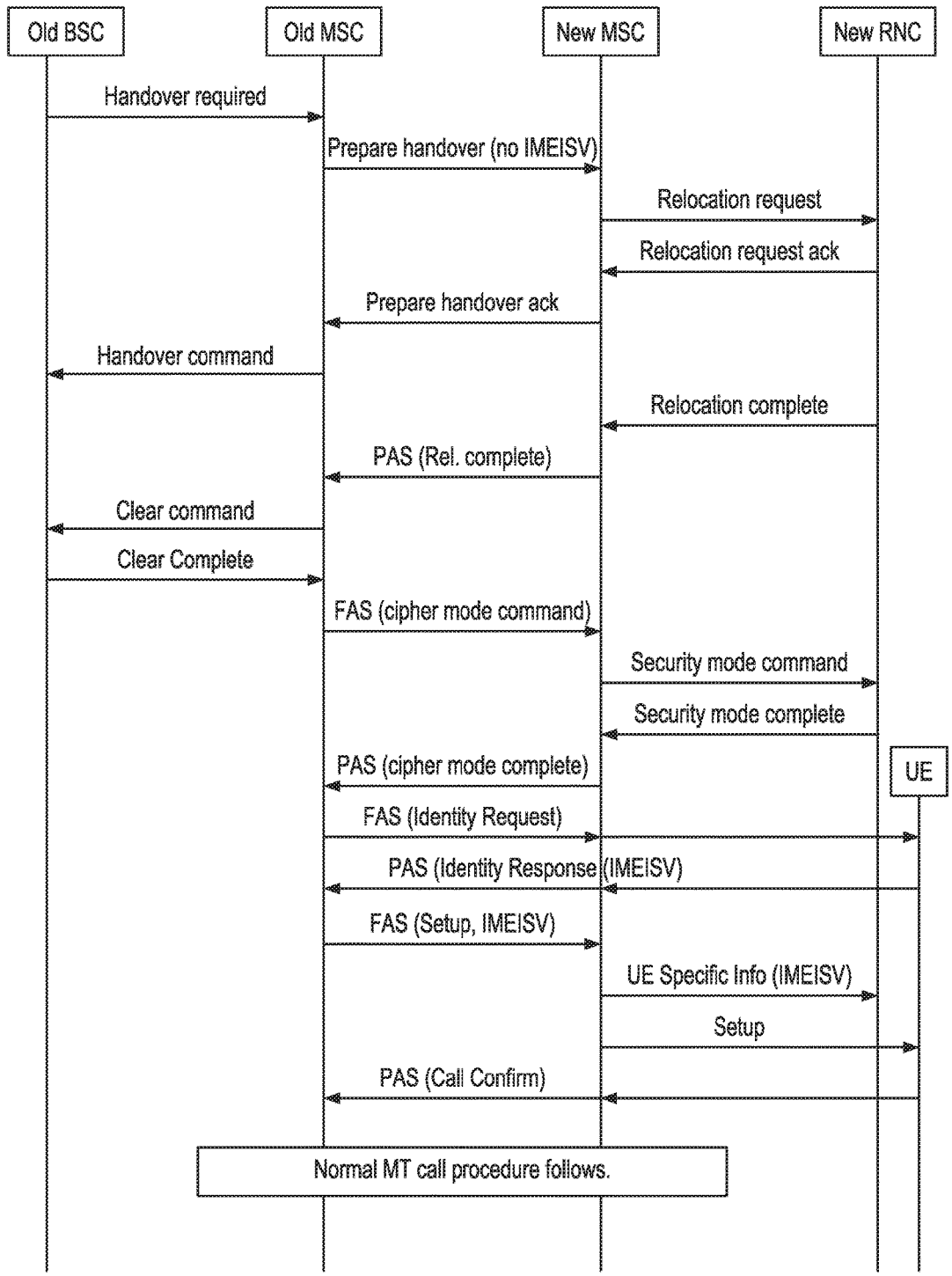
FIG. 6 is a signaling diagram illustrating exemplary signaling for Inter-MSC 2G-3G Handover for mobile origination (MO) if TMSI reallocation is not required.

FIG. 6 is a signaling diagram illustrating exemplary signaling for Inter-MSC 2G-3G Handover for mobile origination (MO) if TMSI reallocation is not required. Again, messaging similar to that described in FIG. 4 will not be repeated. The anchor MSC requests IMEISV from the UE in an identity request, and passes IMEISV and/or UESBI-Iu with Setup to the target MSC. The target MSC passes IMEISV/UESBI-Iu to the target RNC. The target MSC passes the Setup to the mobile device, which responds with a call confirm. Normal MT call procedure then follows.

Figure 7:
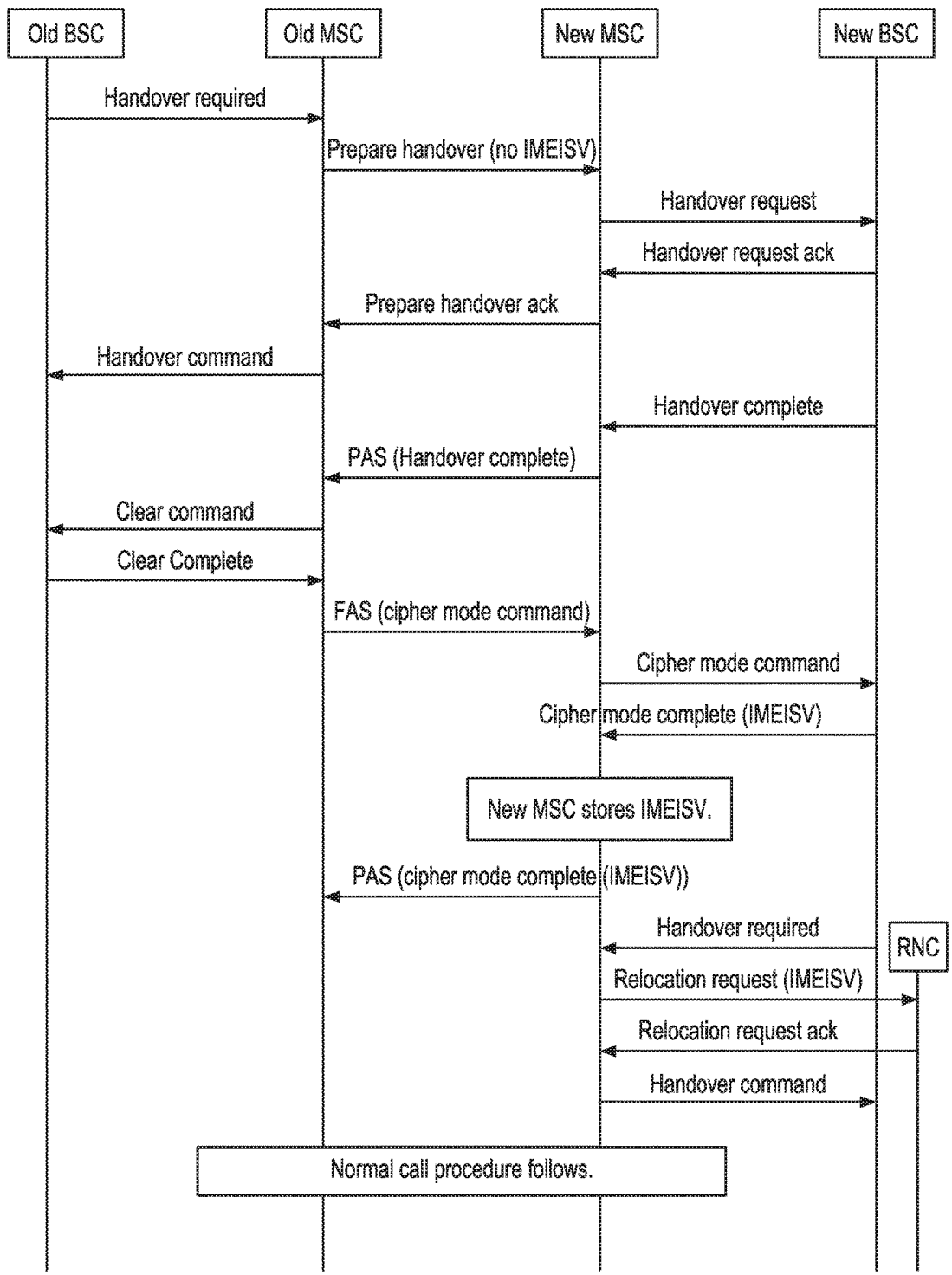
FIG. 7 is a signaling diagram illustrating exemplary signaling for Inter-MSC 2G-2G Handover for MO and MT.

FIG. 7 is a signaling diagram illustrating exemplary signaling for Inter-MSC 2G-2G Handover for MO and MT. Upon determining that a handover is required, the old BSC issues a handover required message to the old MSC directing an inter-MSC handover. Old MSC issues a MAP Prepare Handover message to the target/new MSC/VLR. However, as illustrated, the MAP Prepare Handover message does not include IMEISV.

Target/new MSC issues a handover request to the new BSC which returns a handover request acknowledgement message to the target/new MSC. Thereafter, a prepare handover acknowledgement message is returned by the target/new MSC to the old MSC which issues a handover command to the old BSC. New BSC also issues a handover complete message to the new MSC, which in turn issues a PAS handover complete message to the old MSC, which in turn issues a clear command message to the old BSC directing clearing of information related to the handed over mobile device. The old BSC thereafter responds with a clear complete message.

The old MSC issues a FAS cipher mode command to the new MSC, which in turn issues a cipher mode command to the new BSC. New BSC then issues a cipher mode complete message including the IMEISV to the new MSC.

The target MSC stores IMEISV when IMEISV is received in the Cipher Mode Complete message. For the subsequent intra-MSC handover, the target MSC passes IMEISV/UESBI-Iu to the target RNC. For example, subsequent to receipt of the Cipher Mode Complete message, the new BSC may signal the new MSC that a handover is required. New MSC will then forward a relocation request including the IMEISV to the RNC.

Handover may take place during the location update procedure (followed by MO/MT). After the cipher mode complete, the anchor MSC may send IMEISV and/or UESBI-Iu in MAP FAS with Location Update Accept to the target MSC.

For 3G access, the network obtains IMEISV from the UE in the identification procedure (DTAP Identity Request/Response). The anchor MSC may pass IMEISV and/or UESBI-Iu in MAP FAS (with AN-APDU) to the target MSC if IMEISV is available after the inter-MSC complete.

Figure 8A:
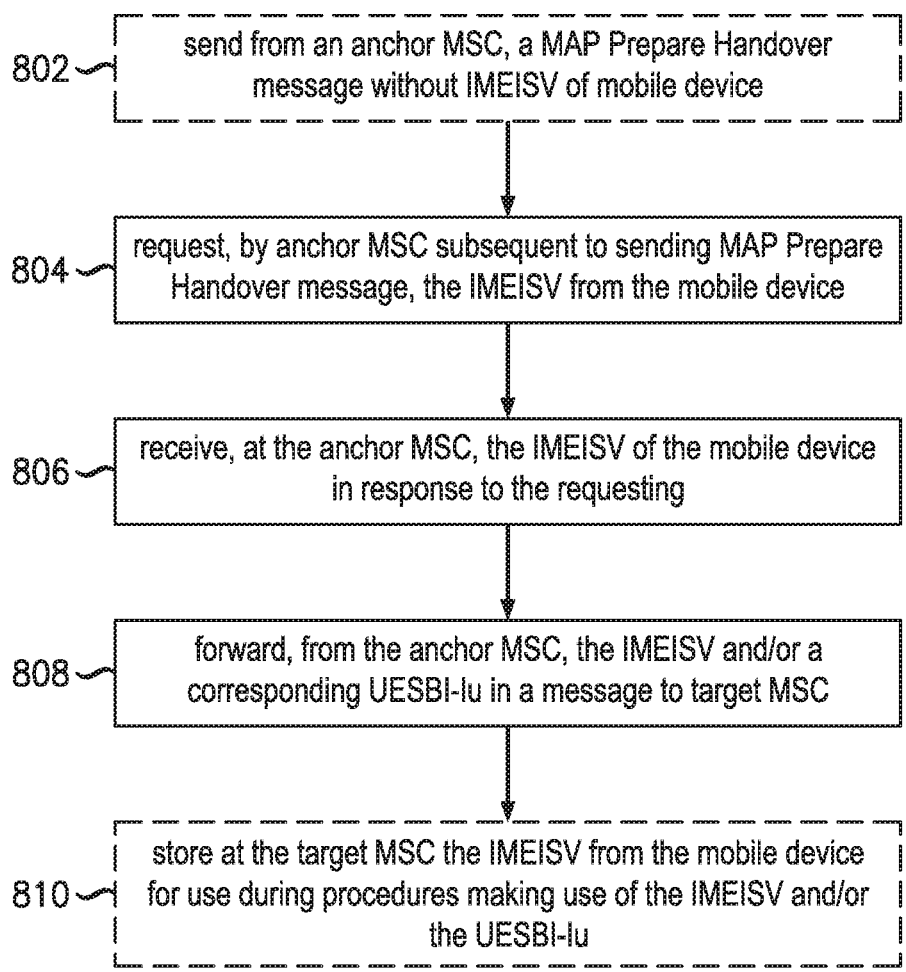
FIG. 8A is a flowchart illustrating an exemplary process for delivering IMEISV to a new MSC for inter-MSC handover.

FIG. 8A is a flowchart illustrating an exemplary process for delivering IMEISV to a new MSC for inter-MSC handover. In FIG. 8A, the method 800 begins at operation 802. At optional operation 802, an anchor MSC sends a Mobile Application Part (MAP) Prepare Handover message without an International Mobile Equipment Identity and Software Version Number (IMEISV) of a mobile device.

At operation 804, the anchor MSC, subsequent to sending the MAP Prepare Handover message, requests the IMEISV of the mobile device from the mobile device. The IMEISV may be requested by initiating a Global System for Mobile Communication (GSM) ciphering mode procedure if the mobile device has been handed over to a GSM/EDGE Radio Access Network (GERAN). The IMEISV may be requested by initiating the Non-Access Stratum (NAS) Identity Request procedure if the mobile device has been handed over to a Universal Terrestrial Radio Access Network (UTRAN).

At operation 806, the anchor MSC receives the IMEISV of the mobile device in response to the requesting.

At operation 808, the anchor MSC forwards the IMEISV and/or a corresponding User Equipment Specific Behaviour Information over the IU interface (UESBI-Iu) value in a message to a target MSC. Operation 808 may pass the IMEISV in a new IMEISV Information Element (IE) and/or the corresponding UESBI-Iu in a new UESBI-Iu IE in a MAP Forward Access Signaling (FAS) message to the target MSC. The FAS message may include an Access Network Application Protocol Data Unit (AN-APDU).

At optional operation 810, a target MSC stores the IMEISV for use during procedures making use of the IMEISV.

Figure 8B:
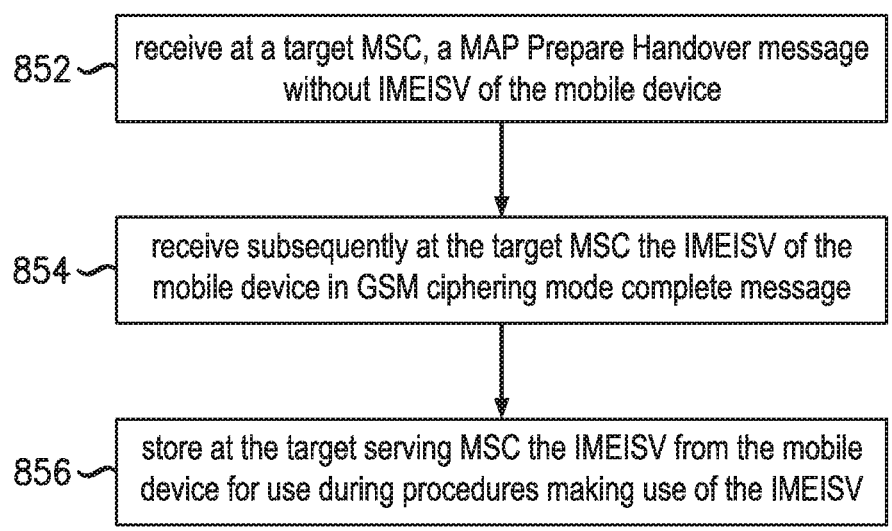
FIG. 8B is a flowchart illustrating an exemplary process associated with inter-MSC handover for receiving IMEISV at a target MSC.

FIG. 8B is a flowchart illustrating an exemplary process associated with inter-MSC handover for receiving IMEISV at a target MSC. IN FIG. 8B, the method 850 begins at operation 852.

At operation 852, a target MSC receives a Mobile Application Part (MAP) Prepare Handover message without an International Mobile Equipment Identity and Software Version Number (IMEISV) of a mobile device.

At operation 854, the target MSC subsequently receives the IMEISV of the mobile device. The IMEISV may be received in Global System for Mobile Communication (GSM) ciphering mode procedure complete message.

At operation 856, the target MSC stores the IMEISV of the mobile device for use during procedures making use of the IMEISV.

Figure 9:
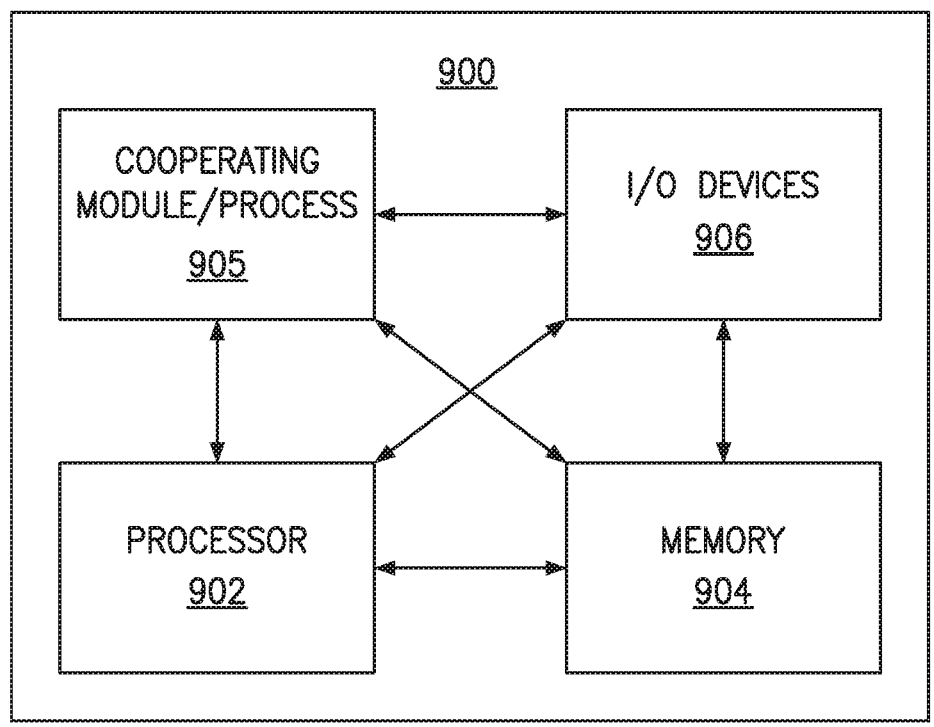
FIG. 9 depicts a high-level block diagram of a computer suitable for use in performing functions described herein.

FIG. 9 depicts a high-level block diagram of a computer suitable for use in performing functions described herein.

The computer 900 includes a processor 902 (e.g., a central processing unit (CPU) or other suitable processor(s)) and a memory 904 (e.g., random access memory (RAM), read only memory (ROM), and the like).

The computer 900 also may include a cooperating module/process 905. The cooperating process 905 can be loaded into memory 904 and executed by the processor 902 to implement functions as discussed herein and, thus, cooperating process 905 (including associated data structures) can be stored on a computer readable storage medium, e.g., RAM memory, magnetic or optical drive or diskette, and the like.

The computer 900 also may include one or more input/output devices 906 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 900 depicted in FIG. 9 provides a general architecture and functionality suitable for implementing functional elements described herein or portions of functional elements described herein. For example, computer 900 provides a general architecture and functionality suitable for implementing one or more of mobile device 80, a portion of a mobile device 110, old MSC/VLR 60, a portion of old MSC/VLR 60, GMSC 30, new MSC/VLR 50, a portion of GMSC 20, a portion of new MSC/VLR 50, HLR 40, a portion of HLR 40, or the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. A MSC is one such electronic computing device.

Note also that the software implemented aspects of the disclosed subject matter are typically encoded on some form of non-transitory medium, program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

It will be appreciated that the term "or" as used herein refers to a non-exclusive "or" unless otherwise indicated (e.g., via use of "or else" or "or in the alternative").

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

The invention claimed is:

1. A method for inter-Mobile Switching Center (MSC) handover of a mobile device, the method comprising:
   sending, when an International Mobile Equipment Identity and Software Version Number (IMEISV) of the mobile device is not yet available, a Mobile Application Part (MAP) Prepare Handover message;
   requesting, by an anchor MSC, subsequent to the sending the MAP Prepare Handover message, the IMEISV of the mobile device from the mobile device;
   receiving, at the anchor MSC, the IMEISV of the mobile device in response to the requesting; and
   forwarding, from the anchor MSC, a corresponding User Equipment Specific Behaviour Information (UESBI) over an IU interface (UESBI-Iu) value in a message to a target MSC.

2. The method of claim 1, further comprising:
   sending from the anchor MSC, the MAP Prepare Handover message.

3. The method of claim 2, wherein the sending the MAP Prepare Handover message comprises:
   sending from the anchor MSC, the MAP Prepare Handover message without the IMEISV of the mobile device.

4. The method of claim 1, wherein the requesting comprises:
   requesting at the anchor MSC the IMEISV from the mobile device by initiating a Global System for Mobile Communication (GSM) ciphering mode procedure if the mobile device has been handed over to a GSM/EDGE Radio Access Network (GERAN) or by initiating a Non-Access Stratum (NAS) Identity Request procedure if the mobile device has been handed over to a Universal Terrestrial Radio Access Network (UTRAN).

5. The method of claim 1, wherein the forwarding comprises:
   passing the IMEISV in a new IMEISV Information Element (IE) and/or the corresponding UESBI-Iu value in a new UESBI-Iu IE in a MAP Forward Access Signaling (FAS) message to the target MSC.

6. The method of claim 5, wherein the passing comprises:
   passing the IMEISV in a new IMEISV Information Element (IE) and/or the corresponding UESBI-Iu value in a new UESBI-Iu IE in a MAP Forward Access Signaling (FAS) message to the target MSC with an Access Network Application Protocol Data Unit (AN-APDU).

7. The method of claim 1, further comprising:
   storing, at the target MSC, the IMEISV from the mobile device and/or the UESBI-Iu value for use during procedures making use of the UESBI-Iu value.

8. A method for inter-Mobile Switching Center (MSC) handover of a mobile device, the method comprising:
   receiving, at a target MSC, when an International Mobile Equipment Identity and Software Version Number (IMEISV) of the mobile device is not yet available, a Mobile Application Part (MAP) Prepare Handover message without the IMEISV of the mobile device;
   receiving, subsequently at the target MSC, the IMEISV of the mobile device; and
   storing, at the target MSC, a corresponding User Equipment Specific Behaviour Information (UESBI) value of the mobile device for use during procedures making use of the IMEISV.

9. The method of claim 8, wherein the receiving, subsequently, the IMEISV comprises:
   receiving the IMEISV in Global System for Mobile Communication (GSM) ciphering mode procedure complete message.

10. An apparatus for use in inter-Mobile Switching Center (MSC) handover of a mobile device, the apparatus comprising a processor and an associated memory, the processor configured to:
    sending, when an International Mobile Equipment Identity and Software Version Number (IMEISV) of the mobile device is not yet available, a Mobile Application Part (MAP) Prepare Handover message;
    request, subsequent to the sending the MAP Prepare Handover message, the IMEISV from the mobile device;
    receive the IMEISV of the mobile device in response to the requesting; and
    forward a corresponding User Equipment Specific Behaviour Information (UESBI) over an IU interface (UESBI-Iu) value in a message to a target MSC.

11. The apparatus of claim 10, wherein the processor is configured to
    request the IMEISV from the mobile device by initiating a Global System for Mobile Communication (GSM)

ciphering mode procedure if the mobile device has been handed over to a GSM/EDGE Radio Access Network (GERAN).

12. The apparatus of claim 10, wherein the processor is configured to
request the IMEISV from the mobile device by initiating a Non-Access Stratum (NAS) Identity Request procedure if the mobile device has been handed over to a Universal Terrestrial Radio Access Network (UTRAN).

13. The apparatus of claim 10, wherein the processor is configured to forward the IMEISV in a new IMEISV Information Element (IE) and/or the corresponding UESBI-Iu value in a new UESBI-Iu IE in a MAP Forward Access Signaling (FAS) message to the target MSC.

14. An apparatus for use in inter-Mobile Switching Center (MSC) handover of a mobile device, the apparatus comprising a processor and an associated memory, the processor configured to:
send, when an International Mobile Equipment Identity and Software Version Number (IMEISV) of the mobile device is not yet available, a Mobile Application Part (MAP) Prepare Handover message;
receive the IMEISV in Global System for Mobile Communication (GSM) ciphering mode procedure complete message; and
store a corresponding User Equipment Specific Behaviour Information (UESBI) value.

15. The apparatus of claim 10, wherein the apparatus is a MSC.

* * * * *